United States Patent
Murata

(10) Patent No.: US 9,323,481 B2
(45) Date of Patent: Apr. 26, 2016

(54) PREVIEW DISPLAY DEVICE, AND METHOD AND COMPUTER READABLE MEDIUM FOR THE SAME

(71) Applicant: Mareyuki Murata, Kuwana (JP)

(72) Inventor: Mareyuki Murata, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/143,019

(22) Filed: Dec. 30, 2013

(65) Prior Publication Data

US 2014/0218760 A1 Aug. 7, 2014

(30) Foreign Application Priority Data

Feb. 1, 2013 (JP) ................................. 2013-018516

(51) Int. Cl.
*G06F 3/12* (2006.01)
*G06K 15/00* (2006.01)
*H04N 1/407* (2006.01)
*H04N 1/409* (2006.01)
*H04N 1/04* (2006.01)

(52) U.S. Cl.
CPC ............ *G06F 3/1204* (2013.01); *G06F 3/1256* (2013.01); *G06F 3/1285* (2013.01); *G06F 3/1239* (2013.01)

(58) Field of Classification Search
CPC ........ G06K 15/025; G06K 15/00; G06F 3/12; G06F 3/10; H04N 1/23
See application file for complete search history.

(56) References Cited

U.S. PATENT DOCUMENTS

| 2005/0286100 | A1* | 12/2005 | Uotani | G06F 3/1205 358/527 |
| 2008/0106772 | A1* | 5/2008 | Ko | H04N 1/00843 358/474 |
| 2008/0186530 | A1* | 8/2008 | Kurozasa | G06F 3/1204 358/1.15 |
| 2010/0235888 | A1* | 9/2010 | Miyamoto | G06F 21/608 726/4 |
| 2010/0271666 | A1* | 10/2010 | Kimura | G06F 21/608 358/3.26 |
| 2011/0188073 | A1* | 8/2011 | Akutsu | G06F 15/00 358/1.15 |
| 2012/0013944 | A1* | 1/2012 | Ehara | G06F 3/1222 358/1.15 |

FOREIGN PATENT DOCUMENTS

JP 2009-070409 A 4/2009

* cited by examiner

*Primary Examiner* — Barbara Reinier
*Assistant Examiner* — Henok A Shiferaw
(74) *Attorney, Agent, or Firm* — Banner & Witcoff, Ltd.

(57) ABSTRACT

A preview display device is provided that includes a display unit, and a controller configured to determine whether a print-requested page requested to be printed is permitted to be printed, based on print restriction information, and control the display unit to display a preview image showing a print result of the print-requested page in advance of printing of the print-requested page, in a manner to distinguish the preview image showing the print-requested page determined to be permitted to be printed from the preview image showing the print-requested page determined to be not permitted to be printed.

13 Claims, 8 Drawing Sheets

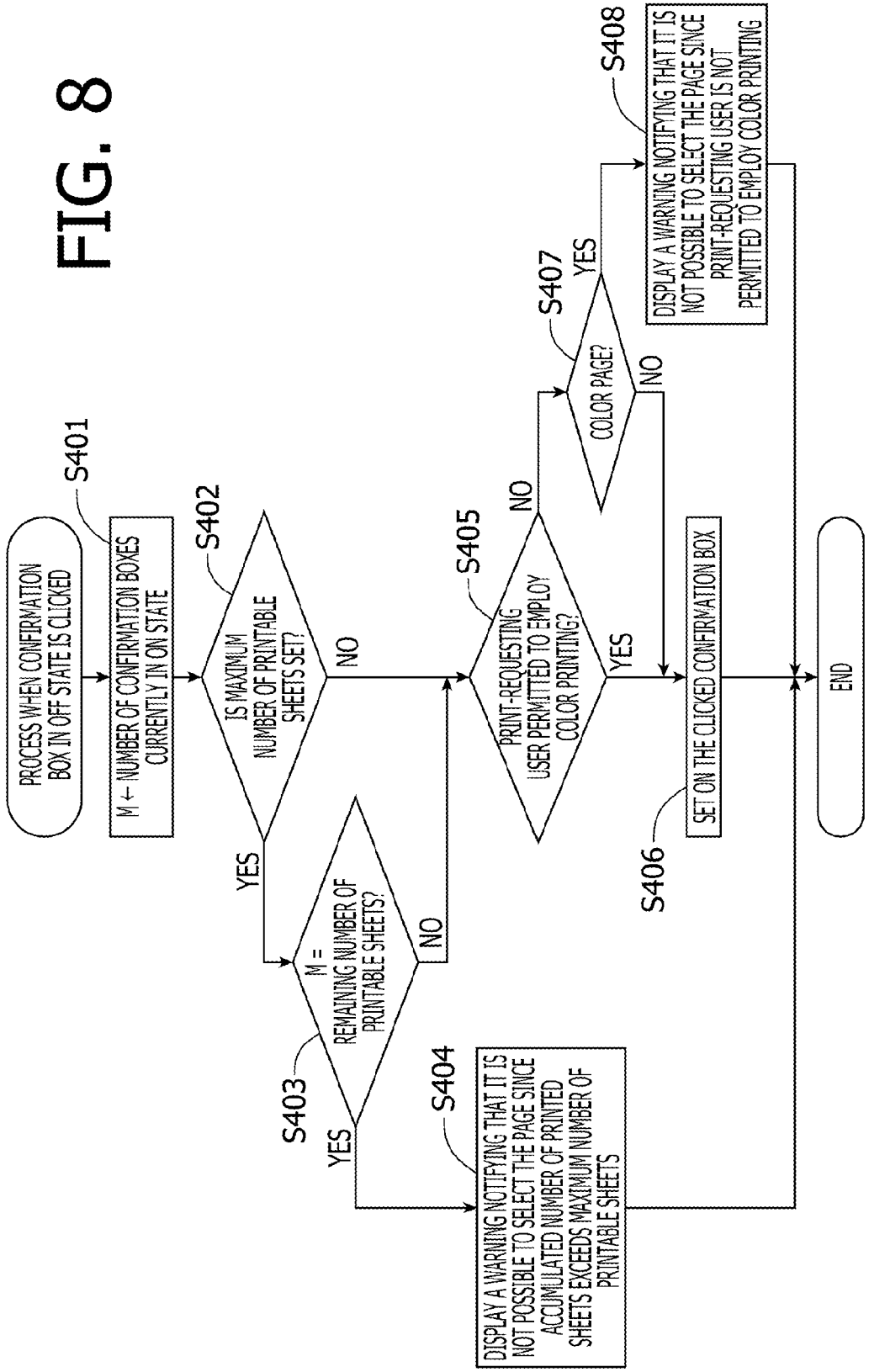

PREVIEW DISPLAY DEVICE, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2013-018516 filed on Feb. 1, 2013. The entire subject matter of the application is incorporated herein by reference.

BACKGROUND

1. Technical Field

The following description relates to one or more techniques to display a preview image showing an anticipated print result of a page in advance of an attempt at printing the page.

2. Related Art

A technique has been known, which is adapted to create a preview image based on document data in accordance with print settings configured on a print setting screen, and to display the preview image in advance of printing of the document data.

SUMMARY

In the meantime, there may be a printer configured to restrict a printing operation based on a predetermined criterion. For instance, there may be a printer configured to prohibit a printing operation in response to an accumulated number of printed sheets reaching the maximum number of printable sheets. However, techniques known so far have not provided any suggestion regarding a preview image configured to be displayed in view of restrictions of a printing operation.

Aspects of the present invention are advantageous to present one or more improved techniques to display a preview image in view of restrictions of a printing operation.

According to aspects of the present invention, a preview display device is provided, which includes a display unit, and a controller configured to determine whether a print-requested page requested to be printed is permitted to be printed, based on print restriction information, and control the display unit to display a preview image showing a print result of the print-requested page in advance of printing of the print-requested page, in a manner to distinguish the preview image showing the print-requested page determined to be permitted to be printed from the preview image showing the print-requested page determined to be not permitted to be printed.

According to aspects of the present invention, further provided is a method configured to be implemented on a processor connected with a display unit, the method including determining whether a print-requested page requested to be printed is permitted to be printed, based on print restriction information, and controlling the display unit to display a preview image showing a print result of the print-requested page in advance of printing of the print-requested page, in a manner to distinguish the preview image showing the print-requested page determined to be permitted to be printed from the preview image showing the print-requested page determined to be not permitted to be printed.

According to aspects of the present invention, further provided is a non-transitory computer readable medium storing computer readable instructions configured to, when executed by a processor coupled to a display unit, cause the processor to determine whether a print-requested page requested to be printed is permitted to be printed, based on print restriction information, and control the display unit to display a preview image showing a print result of the print-requested page in advance of printing of the print-requested page, in a manner to distinguish the preview image showing the print-requested page determined to be permitted to be printed from the preview image showing the print-requested page determined to be not permitted to be printed.

BRIEF DESCRIPTION OF THE ACCOMPANYING DRAWINGS

FIG. 1 is a block diagram of a printing system in a first embodiment according to one or more aspects of the present invention.

FIG. 2 exemplifies a print setting screen and a print preview screen displaying a printable page permitted to be printed in the first embodiment according to one or more aspects of the present invention.

FIG. 3 exemplifies a print preview screen displaying an unprintable page in a gray-out state in the first embodiment according to one or more aspects of the present invention.

Figure 6:
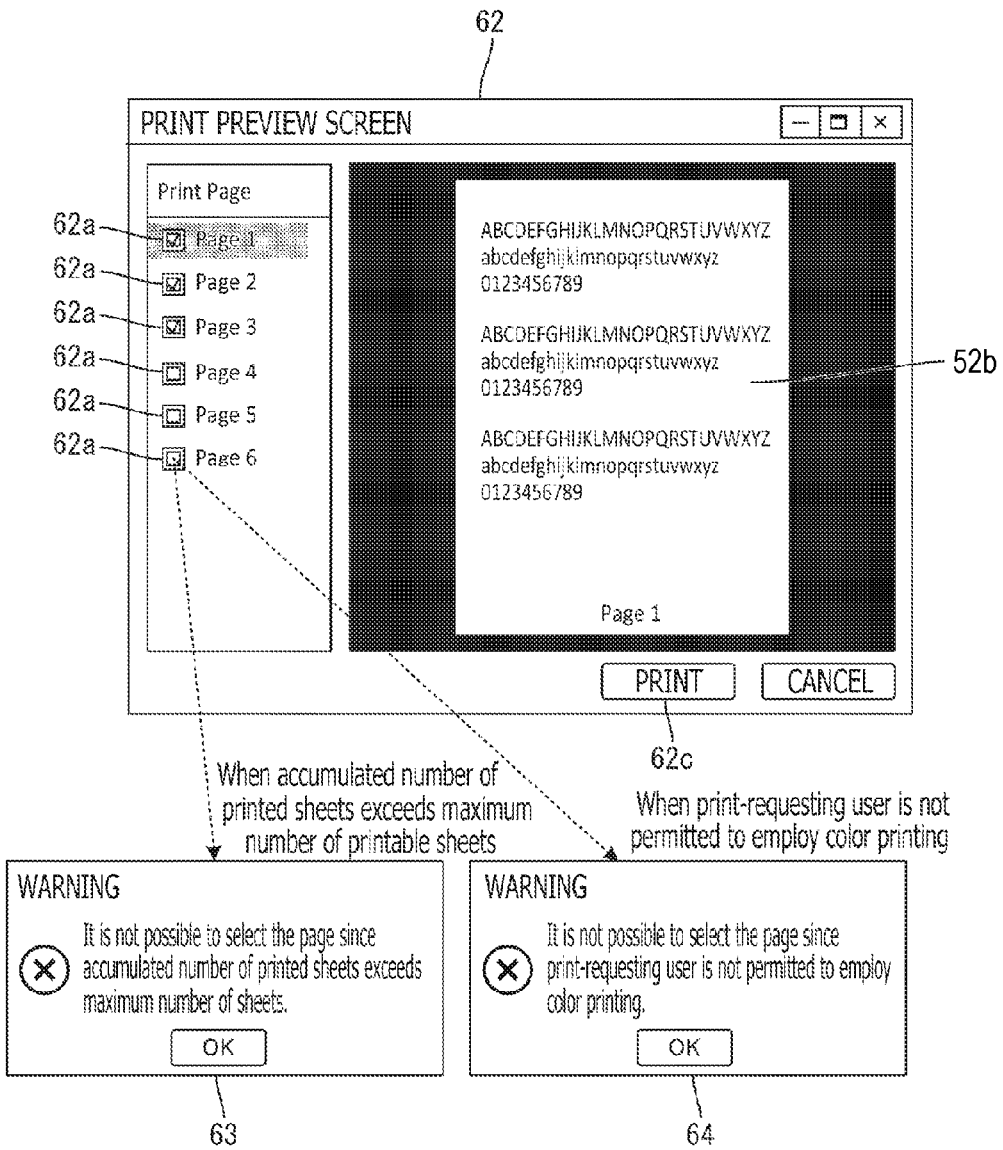

FIG. 6 exemplifies a print preview screen in a second embodiment according to one or more aspects of the present invention.

Figure 7:
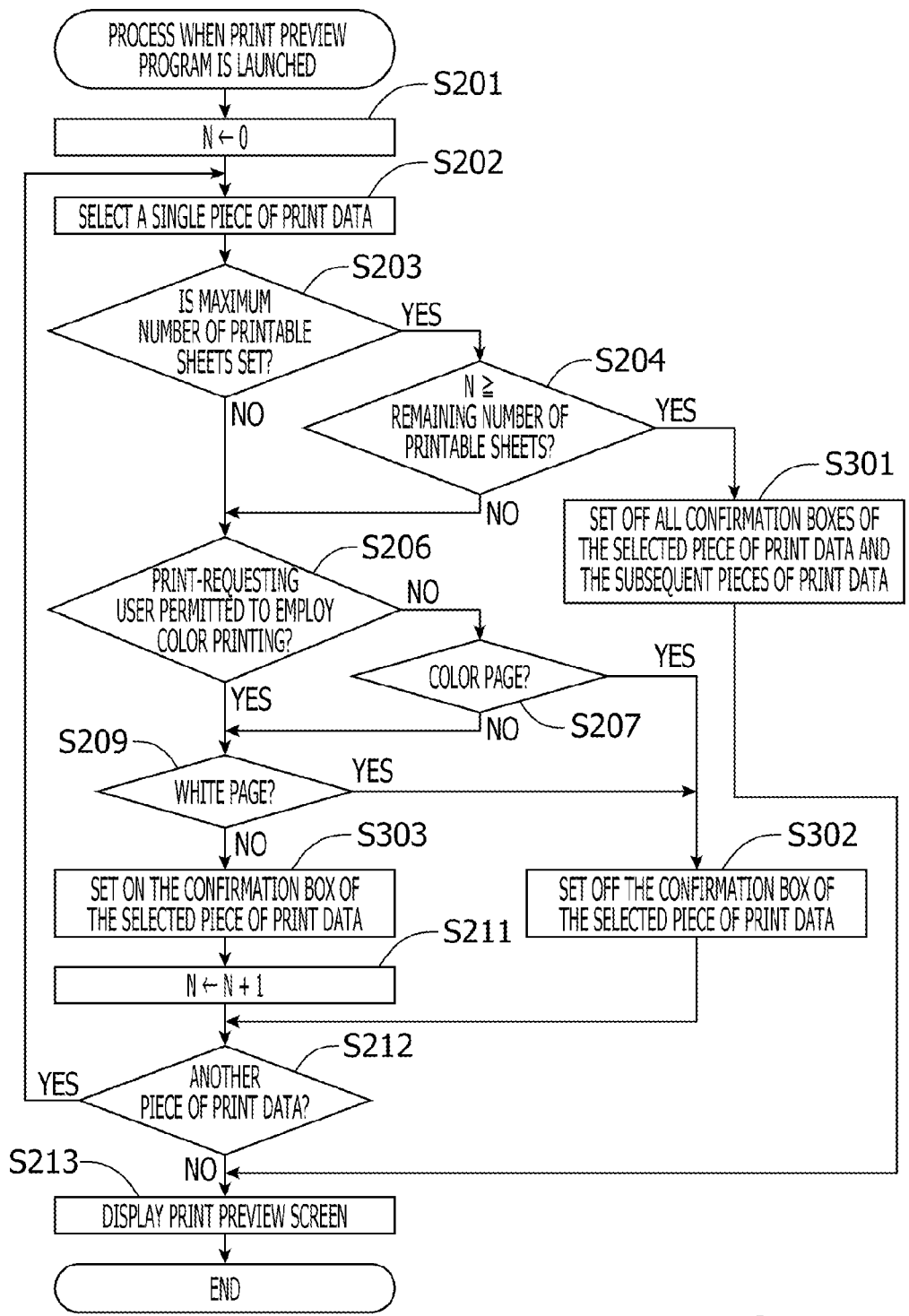

FIG. 7 is a flowchart showing a procedure of a process to be executed when a print preview program is launched in the second embodiment according to one or more aspects of the present invention.

FIG. 8 is a flowchart showing a procedure of a process to be executed when a confirmation box in an OFF state is clicked in the second embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

First Embodiment

Hereinafter, a first embodiment according to aspects of the present invention will be described with reference to FIGS. 1 to 5.

(1) Configuration of Printing System

Figure 1:
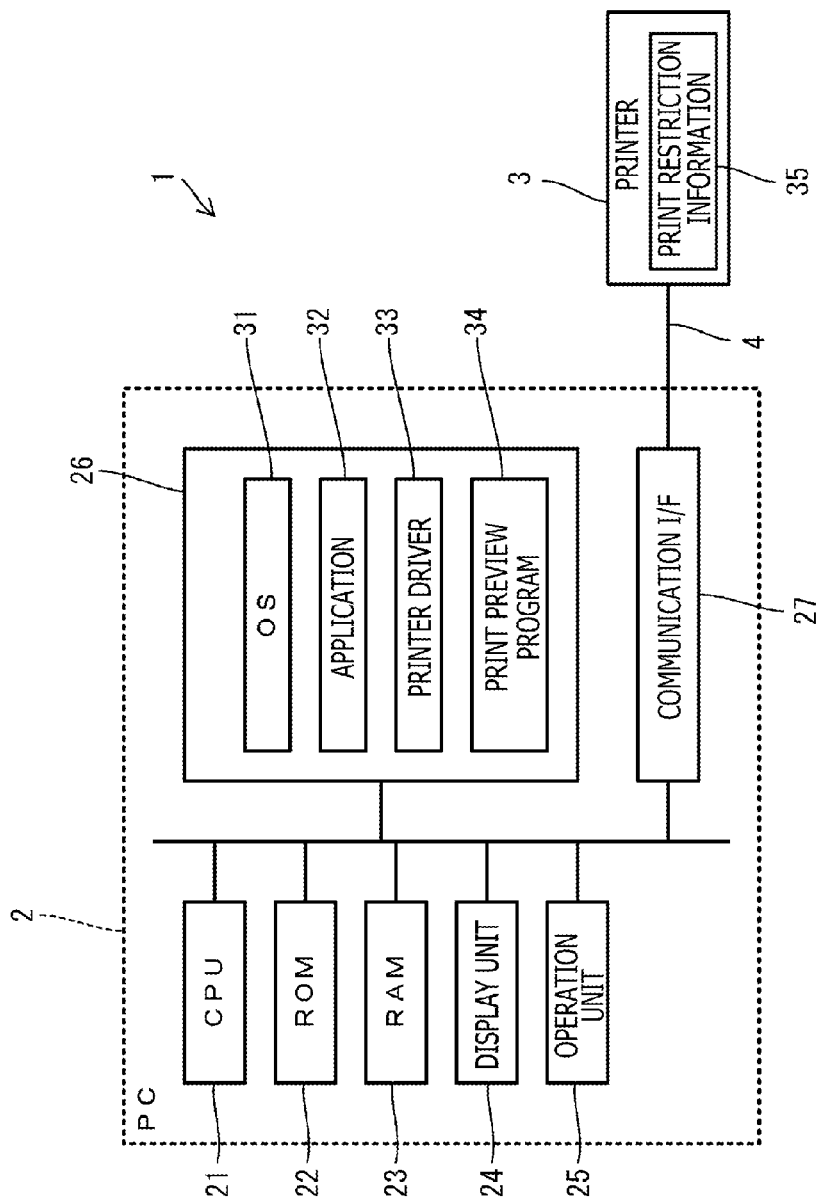

Initially, referring to FIG. 1, a configuration of a printing system 1 will be described. The printing system 1 includes a personal computer (hereinafter, which may be referred to as PC) 2 and a printer 3. The PC 2 is communicably connected with the printer 3 via a communication line 4 such as a universal serial bus (hereinafter, which may be referred to as USB), a local area network (hereinafter, which may be referred to as LAN), and the Internet.

(1-1) Electrical Configuration of PC

Subsequently, referring to FIG. 1, an electrical configuration of the PC 2 will be described. The PC2 includes a CPU 21, a ROM 22, a RAM 23, a display unit 24, an operation unit 25, a storage unit 26, and a communication interface 27.

The CPU 21 is configured to, when executing programs stored in the ROM 22 and the storage unit 26, control each element of the PC 2. The ROM 22 is configured to store data and programs executable by the CPU 21. The RAM 23 is configured to be used as a main storage device when the CPU 21 executes various kinds of processing.

The display unit 24 includes a display device such as a liquid crystal display device, and a display driving circuit for driving the display device. The operation unit 25 includes input devices such as a keyboard and a mouse, and hardware elements for connecting the input devices with the PC 2.

The storage unit 26 includes non-volatile memories such as a hard disk drive and a flash memory. The storage unit 26 is configured to store various types of data and various programs, which include an operating system (hereinafter, which may be referred to as OS) 31, an application program (hereinafter, which may be referred to as an application) 32, a printer driver 33 for controlling the printer 3, and a print preview program 34. The programs stored in the storage unit 26 are executable by the CPU 21. It is noted that the CPU 21, the ROM 22, the RAM 23, and the storage unit 26, which work in cooperation with each other, form a controller for controlling various operations of the PC 2.

The communication interface (I/F) 27 includes a hardware element for communicably connecting the PC 2 with the printer 3. The communication interface 27 may be configured to communicate with the printer 3 via a communication cable such as a USB, wireless communication such as Bluetooth® (trademark registered by BLUETOOTH SIG, INC.), or a communication network such as a LAN and the Internet. Further, when configured to perform communication via the communication network, the communication interface 27 may be connected with the communication network in a wired manner or a wireless manner.

(1-2) Printer

The printer 3 is configured to form an image on a sheet (such as a printing paper) based on print data received from the PC 2 in a predetermined printing method such as an electro-photographical method and an inkjet method.

The printer 3 is configured to accept print restrictions set therefor. The following descriptions will be provided about a restriction of the number of printable sheets and restrictions of printing conditions as examples of the print restrictions. For instance, a restriction of the number of printable sheets may be applied by setting a maximum number (an upper limit number) of printable sheets for each individual user. In this case, for instance, the printer 3 counts an accumulated number of printed sheets for each individual user. When the accumulated number of printed sheets reaches the maximum number of printable sheets set for a user, the user is prohibited from performing a printing operation until the accumulated number of printed sheets is initialized (reset) to zero by an administrator of the printer 3. It is noted that the maximum number of printable sheets is not limited to being set for each individual user, but may be set in an arbitrary unit, e.g., for each individual printer, or for each individual one of departments to which the users belong to. Further, the accumulated number of printed sheets is not limited to being initialized by the administrator, but may be automatically initialized every unit time (e.g., at time intervals of one day).

Further, for instance, restrictions of printing conditions may be applied by setting printing conditions for permitting execution of a printing operation for each individual user. The printing conditions include various conditions such as high-quality image printing, low-quality image printing, color printing, monochrome printing, N-in-one printing, and enlarged/reduced printing. For example, the high-quality image printing, the color printing, and the enlarged printing generally result in high printing costs. Therefore, by not permitting such printing conditions, it is possible to reduce the printing cost. It is noted that printing conditions for permitting execution of a printing operation may be set in an arbitrary unit, e.g., for each individual printer, or for each individual one of departments to which the users belong to. Further, the restrictions of printing conditions may be achieved by setting unallowable printing conditions (instead of setting allowable printing conditions). In this case, printing conditions other than the unallowable printing conditions are allowable. The following description will be provided under an assumption that a determination as to whether to permit the color printing is made for each individual user.

Suppose, for instance, that a user who is not permitted to employ the color printing selects the color printing on a below-mentioned print setting screen 51 (see FIG. 2). In this case, the printer 3 prints only monochrome pages of the pages requested to be printed, but does not print color pages of the requested pages. Alternatively, when the user who is not permitted to employ the color printing selects the color printing, the printer 3 may be prohibited from printing all the requested pages including the monochrome pages.

In the printer 3, stored are information indicating the maximum number of printable sheets and information indicating allowable printing conditions for permitting execution of a printing operation, for each individual user. Hereinafter, these pieces of information may be referred to as print restriction information.

(2) Print Setting Screen and Print Preview Screen

Figure 2:
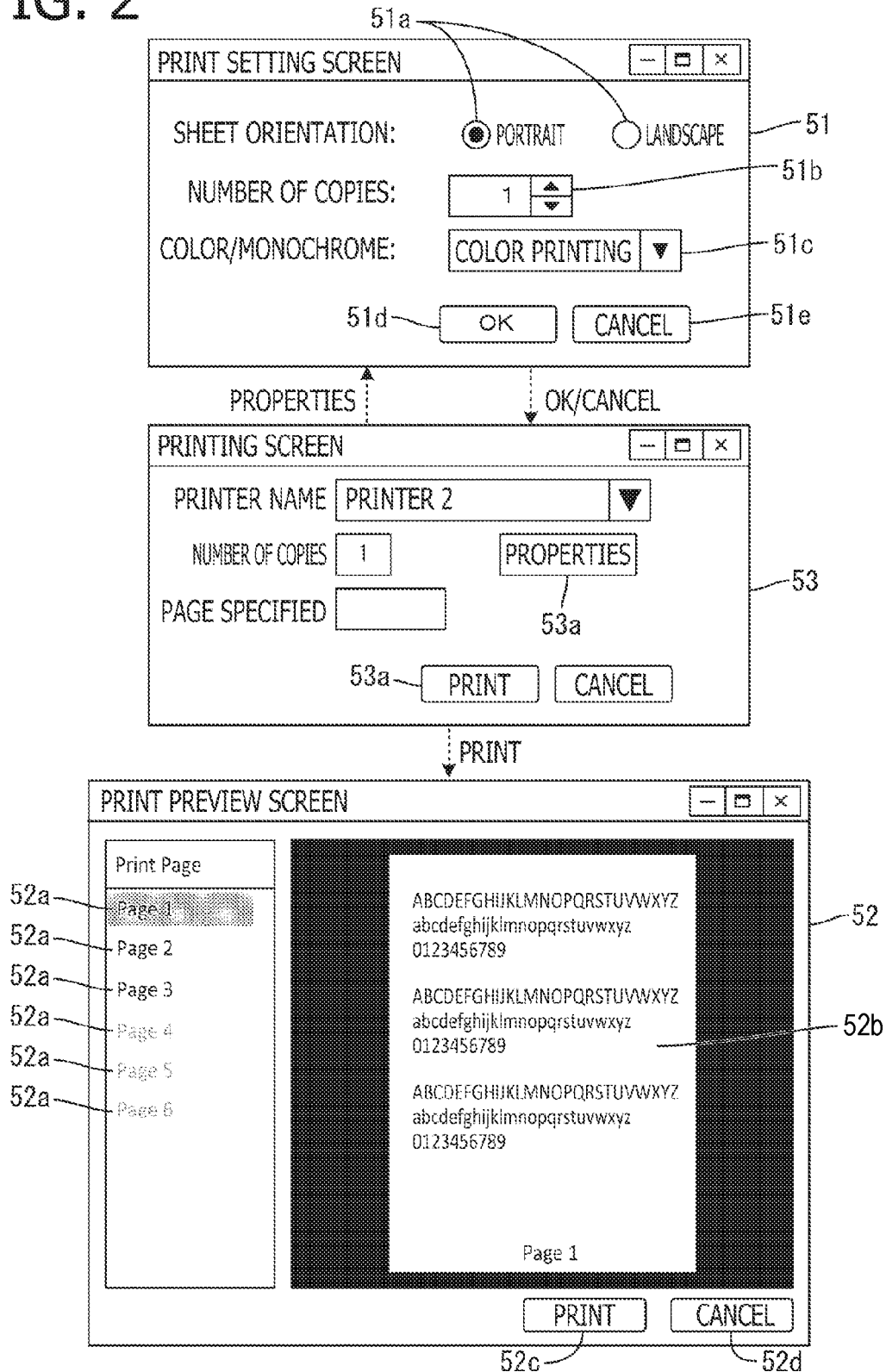

Next, referring to FIG. 2, explanations will be provided about a print setting screen 51 displayed by the printer driver 33 and a print preview screen 52 displayed by the print preview program 34. FIG. 2 shows a printing screen 53 displayed by the application 32 as well as the print setting screen 51 and the print preview screen 52.

By selecting the printer 3 as an intended printer and clicking a properties button 53a on the printing screen 53, the user is allowed to issues an instruction to cause the printer driver 33 to display the print setting screen 51. Upon receipt of the instruction to display the print setting screen 51, the printer driver 33 causes the display unit 24 to display the print setting screen 51. As shown in FIG. 2, on the print setting screen 51, the user is allowed to configure setting values for printing conditions such as an orientation of a printing sheet 51a, the number of print copies 51b, and color printing/monochrome printing 51c. Furthermore, the print setting screen 51 may be configured to accept setting values set thereon for other printing conditions such as high-quality image printing, low-quality image printing, N-in-one printing, and enlarged/reduced printing.

When the user clicks an OK button 51d on the print setting screen 51, the printer driver 33 updates default setting values for the printing conditions stored on the RAM 23 with setting values configured on the print setting screen 51, and closes the print setting screen 51. Meanwhile, when a cancel button 51e is clicked, the printer driver 33 cancels the setting values configured on the print setting screen 51, and closes the print setting screen 51.

When the user clicks a print button 53b on the printing screen 53, the application 32 issues a request for printing of pages to the printer driver 33 via the OS 31. The request includes (page data of) the pages to be printed. Upon receipt of the request from the application 32, the printer driver 33 creates print data for each of the pages requested to be printed, and creates, from the created print data, a preview image showing an anticipated print result in advance of an attempt at printing the corresponding page. Then, the printer driver 33 lunches the print preview program.

The print preview program 34, launched by the printer driver 33, causes the display unit 24 to display the print preview screen 52 and to display the preview image created by the printer driver 33 on the print preview screen 52. The print preview screen 52, as exemplified in FIG. 2, shows a list of page numbers 52a of the pages requested to be printed in a left-side area on the print preview screen 52. When the user clicks one of the page numbers 52a, a preview image 52b of the page corresponding to the clicked page number 52a is displayed in a right-side area on the print preview screen 52.

On the print preview screen 52, displayed are a print button 52c and a cancel button 52d. When the print button 52c is clicked, the print preview program 34 transmits the print data created by the printer driver 33 to the printer 3, and causes the printer 3 to perform a printing operation. When the cancel button 52d is clicked, the print preview program 34 cancels the print data and terminates the process.

As will be described in detail, in response to receipt of the request for printing of the pages, the printer driver 33 acquires user identification information, and requires print restriction information corresponding to the acquired user identification information. Then, with respect to each individual page of the requested pages, the print preview program 34 determines whether the printer 3 permits printing of the page, based on the print restriction information acquired by the printer driver 33. Further, the print preview program 34 causes the print preview screen 52 to display a preview image of the page in a manner to distinguish the preview image showing a printable page permitted to be printed by the printer 3 from the preview image showing an unprintable page not permitted to be printed.

More specifically, in the first embodiment, the print preview program 34 causes the print preview screen 52 to display a preview image of a printable page and a preview image of an unprintable page in respective different display modes. For instance, FIG. 2 exemplifies the print preview screen 52 displaying the preview image 52b of a printable page permitted to be printed. As shown in FIG. 2, the preview image 52b and the page number 52a of the printable page permitted to be printed are displayed without being shown in a gray-out state.

Figure 3:
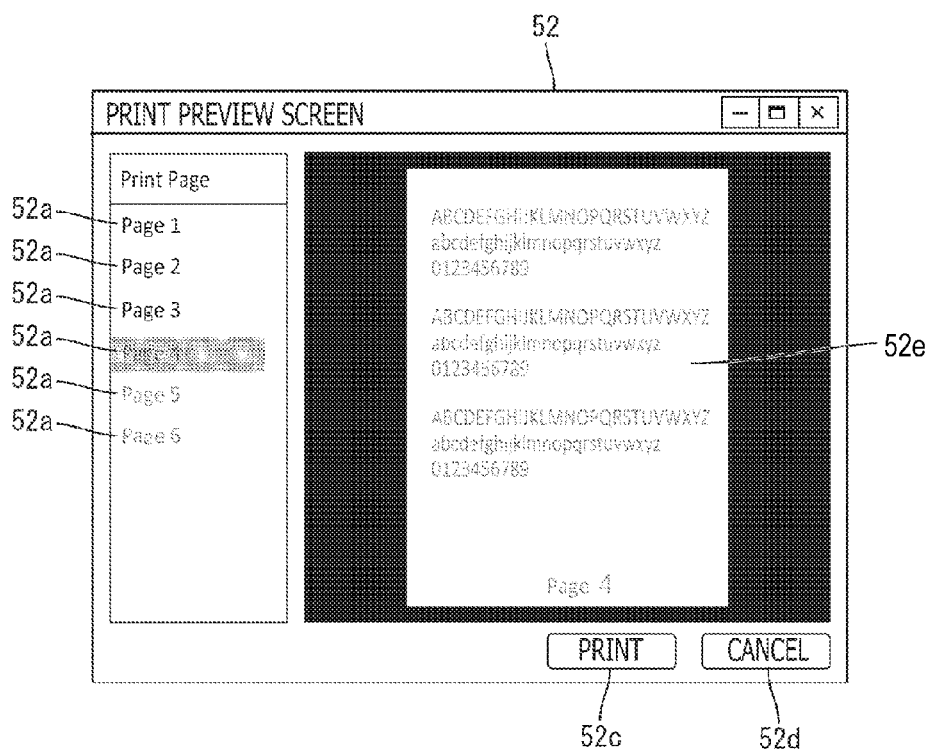

On the contrary, FIG. 3 exemplifies a case where the print preview screen 52 displays a preview image 52e of an unprintable page not permitted to be printed (more specifically, a preview image 52e of Page 4). As shown in FIG. 3, the preview image 52e and the page number 52a of the unprintable page not permitted to be printed are displayed in a gray-out state.

(3) Processes by Printer Driver and Print Preview Program

Subsequently, explanations will be provided about a process by the printer driver 33 and a process by the print preview program 34 in response to the application 32 issuing the request for printing of the pages to be printed, with reference to flowcharts.

(3-1) Process by Printer Driver

Figure 4:
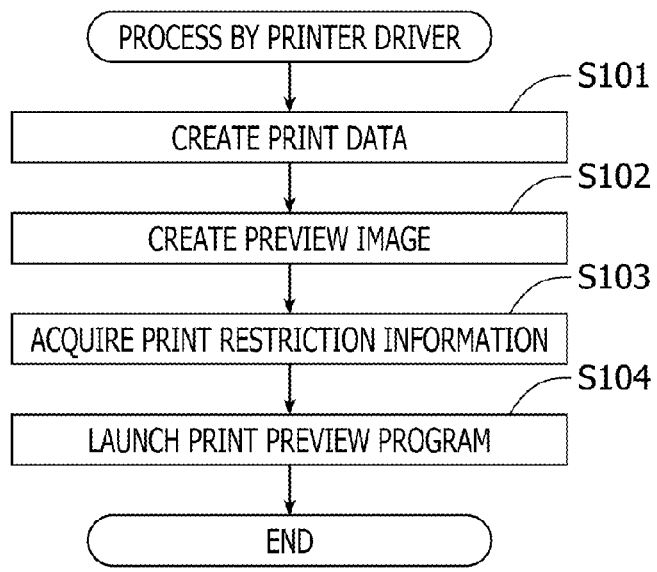
FIG. 4 is a flowchart showing a procedure of a process by a printer driver in the first embodiment according to one or more aspects of the present invention.
Figure 5:
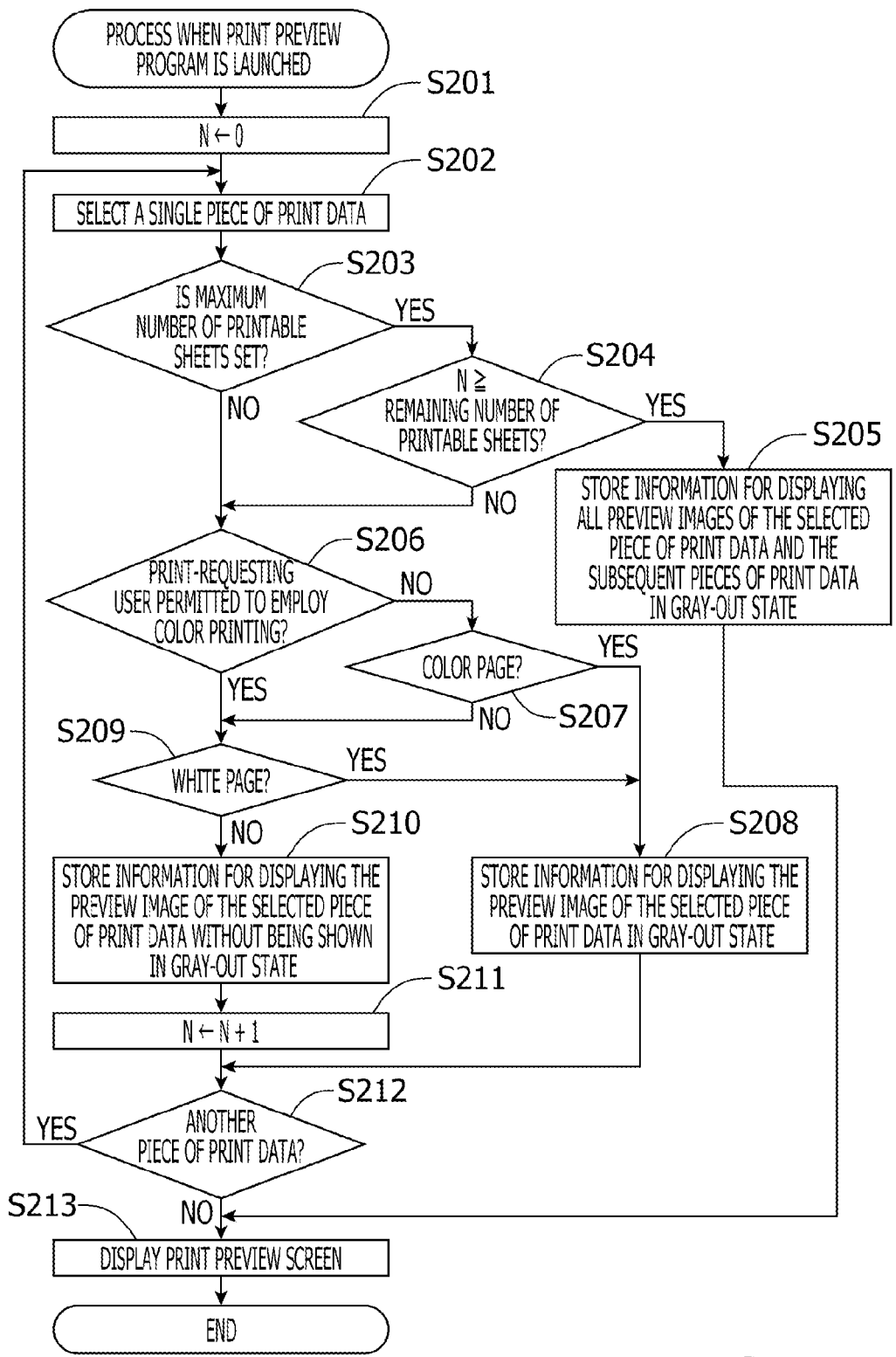
FIG. 5 is a flowchart showing a procedure of a process to be executed when a print preview program is launched in the first embodiment according to one or more aspects of the present invention.

Referring to FIG. 4, an explanation will be provided about a process by the printer driver 33 in response to the request for page printing from the application 32. The process is launched when the application 32 issues the request for page printing to the printer driver 33. Hereinafter, the pages requested by the application 32 to be printed may be referred to as the pages to be printed. Further, the following description will be provided under an assumption that the user sets the color printing on the print setting screen 51.

In S101, the printer driver 33 (more specifically, the CPU 21 executing the printer driver 33) creates print data for each of the pages to be printed, based on the printing conditions stored in the RAM 23. For instance, when the color printing is set as a printing condition, the printer driver 33 creates color print data for color pages, and creates monochrome print data for monochrome pages. Meanwhile, when the monochrome printing is set as a printing condition, the printer driver 33 creates monochrome print data for each of the pages to be printed, regardless of whether the page is a color page or a monochrome page. In S102, the printer driver 33 creates a preview image showing an anticipated print result in advance of an attempt at performing a printing operation for each piece of the print data created in S101. In this case, the preview images are created from the print data created in S101. Alternatively, the preview images may be created directly from (the page data of) the pages to be printed.

In S103, by issuing a request for user identification information of a user who is currently logging-in to the OS 31 using an application programming interface (API), or by reading out the user identification information previously set by the user in the printer driver 33, the printer driver 33 acquires the user identification information. Further, the printer driver 33 acquires print restriction information corresponding to the acquired user identification information. In S104, the printer driver 33 launches the print preview program 34, and terminates the process shown in FIG. 4.

(3-2) Processes by Print Preview Program

Subsequently, with respect to processes by the print preview program 34 launched by the printer driver 33 in S104, explanations will be provided separately about a process when the print preview program 34 is launched and a process when the print button is clicked on the print preview screen 52.

(3-2-1) Process when Print Preview Program is Launched

In S201, the print preview program 34 (more specifically, the CPU 21 executing the print preview program 34) sets the number of print-requested sheets N to zero as an initial value. The number of print-requested sheets N is a parameter (counter) configured to count the number of sheets to be printed based on the print data created in accordance with the request for page printing. In S202, the print preview program 34 selects a single piece of print data from among the print data created by the printer driver 33 for each of the pages to be printed. The selection is made in an order of the page numbers from a piece of print data of the first page.

In S203, the print preview program 34 determines whether the maximum number of printable sheets is set for the print-requesting user who has issued the request for page printing, based on the print restriction information acquired in S103. It is noted that the acquisition of the print restriction information from the printer 3 may be carried out not by the printer driver 33 but by the print preview program 34. When determining that the maximum number of printable sheets is set for the print-requesting user (S203: Yes), the print preview program 34 goes to S204. Meanwhile, when determining that the maximum number of printable sheets is not set for the print-requesting user (S203: No), the print preview program 34 goes to S206.

In S204, the print preview program 34 determines whether the number of print-requested sheets N is equal to or more than a remaining number of printable sheets. The remaining number of printable sheets is the number of sheets resulting from subtracting the accumulated number of printed sheets at a time immediately before the present process is launched from the maximum number of printable sheets for the print-requesting user. Namely, during the execution of the process, the remaining number of printable sheets is constant. The accumulated number of printed sheets is counted for each individual user by the printer 3. The printer driver 33 acquires, from the printer 3, the accumulated number of printed sheet for the print-requesting user in S103. In this regard, instead, the print preview program 34 may acquire, from the printer 3, the accumulated number of printed sheet for the print-requesting user. When determining that the number of print-requested sheets N is equal to or more than the remaining number of printable sheets (S204: Yes), the print preview program 34 goes to S205, determining that it is not permitted to print the page selected in S202 or the subsequent pages. Meanwhile, when determining that the number of print-requested sheets N is less than the remaining number of printable sheets (S204: No), the print preview program 34 goes to S206.

In S205, the print preview program 34 stores information for displaying all preview images of the single piece of print data selected in S202 and the subsequent pieces of print data in a gray-out state. Thereby, when a page number is selected on the print preview screen 52 from among page numbers corresponding to the print data selected in S202 and the subsequent pieces of print data, a preview image of the selected page number is displayed in a gray-out state. In S206, the print-preview program 34 determines whether the print-requesting user is permitted to employ the color printing, based on the print restriction information. When determining that the print-requesting user is not permitted to employ the color printing (S206: No), the print-preview program 34 goes to S207. Meanwhile, when determining that the print-requesting user is permitted to employ the color printing (S206: Yes), the print-preview program 34 goes to S209.

In S207, the print preview program 34 determines whether the print data selected in S202 is data expressing a color page. For instance, the determination in S207 may be made by examining whether pixels constituting the print data selected in S202 contain a pixel expressing a chromatic color. When determining that the print data selected in S202 is data expressing a color page (S207: Yes), the print preview program 34 goes to S208. Meanwhile, when determining that the print data selected in S202 is not data expressing a color page (S207: No), the print preview program 34 goes to S209.

In S208, the print preview program 34 stores information for displaying the preview image of the print data selected in S202 in a gray-out state. Thereby, when the page number corresponding to the print data selected in S202 is selected on the print preview screen 52, the preview image of the selected page number is displayed in a gray-out state.

In S209, the print preview program 34 determines whether the print data selected in S202 is data expressing a white page. For instance, the determination in S209 may be made by examining whether a ratio of pixels expressing white color to all the pixels constituting the print data selected in S202 is equal to or more than a predetermined ratio. The pixels expressing white color may include pixels having CMYK densities equal to or close to (0, 0, 0, 0) in the case where the print data is expressed by a CMYK color space. Further, when the print data is expressed by an RGB color space, the determination as to whether a target pixel contained in the print data is a pixel expressing white color may be made based on an RGB density of the target pixel. When determining that the print data selected in S202 is not data expressing a white page (S209: No), the print preview program 34 goes to S210. Meanwhile, when determining that the print data selected in S202 is data expressing a white page (S209: Yes), the print preview program 34 goes to S208.

In S210, the print preview program 34 stores information for displaying the preview image of the print data selected in S202 without being shown in a gray-out state. Thereby, when the page number corresponding to the print data selected in S202 is selected on the print preview screen 52, the preview image of the selected page number is displayed without being shown in a gray-out state. In S211, the print preview program 34 increments the print-requested sheet number N by one. In S212, the print preview program 34 determines whether there is another piece of print data. When determining that there is not another piece of print data (S212: No), the print preview program 34 goes to S213. Meanwhile, when determining that there is another piece of print data (S212: Yes), the print preview program 34 goes back to S202.

In S213, the print preview program 34 displays the print preview screen 52 as shown in FIG. 2. On the print preview screen 52, a preview image of the first page is displayed as a default display in a state where the first page is selected. When information for displaying the preview image of the first page in a gray-out state is stored in S205 or S208, the preview image of the first page is displayed in a gray-out state. Meanwhile, when information for displaying the preview image of the first page without being shown in a gray-out state is stored in S205 or S208, the preview image of the first page is displayed as originally created by the printer driver 33. It is noted that the display mode for displaying the print preview screen 52 is not limited to the mode shown in FIG. 2 but may be a mode in which preview images of all the pages to be printed are reduced and arranged side by side.

The above descriptions have been provided under the assumption that the user has set the color printing on the print setting screen 51. However, when the user has set the monochrome printing, the print preview program 34 may be configured to advance to S209 without executing S206 or S207, for the following reason. That is, when the monochrome printing is set, monochrome print data is created for any of the pages to be printed even though the page is originally a color page. Namely, it is always determined in S207 that the print data selected in S202 is not data expressing a color page (S207: No).

(3-2-2) Process when Print Button is Clicked

Next, an explanation will be provided about a process to be performed when the print button 52c is clicked on the print preview screen 52. When the print button 52c is clicked, the print preview program 34 terminates the displaying of the print preview screen 52. Further, the print preview program 34 transmits all pieces of print data created in S101 to the printer 3, and causes the printer 3 to perform a printing operation. In this respect, however, when the pages to be printed include an unprintable page not permitted to be printed, print data of the unprintable page is not allowed to be printed by the printer 3. In this case, the printer 3 performs a printing operation based on only print data of printable pages permitted to be printed.

(4) Advantageous Effects of First Embodiment

As described above, according to the print preview program 34 of the first embodiment, a preview image is displayed on the print preview screen 52 in a manner to distinguish the preview image showing a printable page permitted to be printed by the printer 3 from the preview image showing an unprintable page not permitted to be printed. Thus, it is possible to display the preview image in view of the print restrictions of the printer 3. Thereby, the user is allowed to easily discriminate printable pages from unprintable pages, in advance of the printing operation.

Further, according to the print preview program 34 of the first embodiment, when the accumulated number of printed sheets reaches the maximum number of printable sheets, the user is allowed to easily discriminate printable pages from unprintable pages, in advance of the printing operation.

Further, according to the print preview program 34 of the first embodiment, when a printing condition for restricting the printing operation is set, the user is allowed to easily discriminate printable pages from unprintable pages, in advance of the printing operation.

Further, according to the print preview program 34 of the first embodiment, even though a target page is a printable page permitted to be printed, when the target page is a white page, a preview image of the target page is displayed in the same display mode as a preview image of an unprintable page. Therefore, the user is allowed to easily realize that the white page is not permitted to be printed, in advance of the printing operation.

Second Embodiment

Subsequently, a second embodiment will be described with reference to FIGS. 6 to 8. The print preview program 34 of the second embodiment displays a print preview screen 62 as shown in FIG. 6, instead of the print preview screen 52 of the first embodiment. On the print preview screen 62, a confirmation box 62a is displayed on a left side of each page number. Each confirmation box 62a is configured to be checked (i.e., put into a state where a check mark is placed therein) when selected by the user. According to the print preview program 34 of the second embodiment, when the print button 62c is clicked, only print data of checked pages (i.e., pages of which the confirmation boxes thereof are checked) is transmitted to the printer 3. Then, the printer 3 is caused to perform a printing operation based on the print data of the checked pages.

Suppose, for instance, that the number of the print-requested pages is six, and the remaining number of printable sheets is three. In this case, when displaying the print preview screen 62, the print preview program 34 sets ON (checked) the confirmation boxes 62a of the first to third pages permitted to be printed, and sets OFF (unchecked) the confirmation boxes 62a of the fourth to sixth pages, as initial states of the confirmation boxes 62a.

Namely, in the second embodiment, by setting ON the printable pages permitted to be printed and setting OFF the unprintable pages not permitted to be printed, the print preview program 34 displays a preview image in a manner to distinguish the preview image showing a printable page from the preview image showing an unprintable page.

In this respect, however, even though a target page is a printable page permitted to be printed, when the target page is a white page, the print preview program 34 sets OFF an initial state of the confirmation box 62a of the target page.

In the above example, suppose for instance that the user wishes to print the sixth page instead of the first page. Further, suppose for instance that the user clicks (sets ON) the confirmation box of the sixth page before setting OFF the confirmation box 62a of the first page. When a confirmation box 62a currently set OFF is clicked and immediately set ON, the confirmation box 62a of an unprintable page not permitted to be printed by the printer 3 might be set ON.

In view of the above problem, the print preview program 34 is configured to, when a confirmation box 62a currently set OFF is clicked, determine whether a page corresponding to the clicked confirmation box 62a is a printable page, based on the print restriction information. Then, when determining that the page corresponding to the clicked confirmation box 62a is a printable page, the print preview program 34 sets ON the clicked confirmation box 62a. Meanwhile, when determining that the page corresponding to the clicked confirmation box 62a is an unprintable page, the print preview program 34 does not set ON the clicked confirmation box 62a.

For instance, in the aforementioned example, when the confirmation box 62a of the sixth page is set ON, the accumulated number of printed sheets exceeds the maximum number of printable sheets set for the user. Therefore, the confirmation box 62a of the sixth page is left OFF. In order to print the sixth page in the aforementioned example, the user may first set OFF the confirmation box 62a of the first page. When the confirmation box 62a of the first page is set OFF, the number of sheets (pages) to be printed is reduced from three to two, and one more page is allowed to be printed. Therefore, after the confirmation box 62a of the first page is set OFF, it is possible to set ON the confirmation box 62a of the sixth page.

Further, suppose as another example that the print-requesting user is not permitted to employ the color printing. Additionally, suppose that the first to third pages are monochrome pages, and the fourth to sixth pages are color pages. In this case, even though the confirmation box 62a of the sixth page is clicked after the confirmation box 62a of the first page is set OFF, the confirmation box 62a of the sixth page is left OFF since the sixth page is a color page. Namely, in this case, it is possible to switch only the confirmation boxes 62a of the first to third pages between the ON state and the OFF state.

(1) Processes by Print Preview Program

Subsequently, with respect to processes by the print preview program 34, explanations will be provided separately about a process when the print preview program 34 is launched and a process when an unchecked confirmation box 62a (i.e., a confirmation box 62a in the OFF state) is clicked on the print preview screen 62.

(1-1) Process when Print Preview Program is Launched

Referring to FIG. 7, an explanation will be provided about a process to be performed when the print preview program 34 is launched in the second embodiment. In the following description, operations by the print preview program 34 in the second embodiment that are substantially identical to the corresponding operations by the print preview program 34 in the first embodiment will be provided with the same reference characters as those in the first embodiment. Further, explanations of such operations will be omitted. In the second embodiment, the print preview program 34 is configured to execute S301, S302, and S303 (see FIG. 7) instead of S205, S208, and S210 in the first embodiment.

In S301, the print preview program 34 (more specifically, the CPU 21 executing the print preview program 34) sets OFF all the confirmation boxes 62a of the single piece of print data selected in S202 and the subsequent pieces of print data. In S302, the print preview program 34 sets OFF the confirmation box 62a of the single piece of print data selected in S202.

In S303, the print preview program 34 sets ON the confirmation box 62a of the single piece of print data selected in S202.

(1-2) Process when Confirmation Box in OFF State is Clicked on Print Preview Screen Next, referring to FIG. 8, an explanation will be provided about a process to be performed when an unchecked confirmation box 62a (a confirmation box 62a in the OFF state) is clicked on the print preview screen 62.

In S401, the print preview program 34 (more specifically, the CPU 21 executing the print preview program 34) sets a parameter M to the number of confirmation boxes 62a currently in the ON state as an initial value of the parameter. The parameter M indicates the number of confirmation boxes 62a currently in the ON state. It is noted that the confirmation box 62a clicked this time is not included in the confirmation boxes 62a currently in the ON state. In S402, the print preview program 34 determines whether the maximum number of printable sheets is set for the print-requesting user who has issued the request for page printing, based on the print restriction information. When determining that the maximum number of printable sheets is set for the print-requesting user (S402: Yes), the print preview program 34 goes to S403. Meanwhile, when determining that the maximum number of printable sheets is not set for the print-requesting user (S402: No), the print preview program 34 goes to S405.

In S403, the print preview program 34 determines whether the parameter M indicating the number of confirmation boxes 62a currently in the ON state is equal to the remaining number of printable sheets. When determining that the parameter M is equal to the remaining number of printable sheets (S403: Yes), the print preview program 34 goes to S404, determining that it is not possible to perform any further printing operation, and determining not to set ON the clicked confirmation box 62a. Meanwhile, when determining that the parameter M is less than the remaining number of printable sheets (S403: No), the print preview program 34 goes to S405.

In S404, the print preview program 34 causes the display unit 24 to display a warning 63 (see FIG. 6) notifying that it is not possible to select the page corresponding to the clicked confirmation box 62a since the accumulated number of printed sheets exceeds the maximum number of printable sheets. In S405, the print preview program 34 determines whether the print-requesting user is permitted to employ the color printing, based on the print restriction information. When determining that the print-requesting user is permitted to employ the color printing (S405: Yes), the print preview program 34 goes to S406. Meanwhile, when determining that the print-requesting user is not permitted to employ the color printing (S405: No), the print preview program 34 goes to S407. In S406, the print preview program 34 sets ON the clicked confirmation box 62a.

In S407, the print preview program 34 determines whether print data corresponding to the clicked confirmation box 62a is of a color page. When determining that the print data corresponding to the clicked confirmation box 62a is not of a color page (S407: No), the print preview program 34 goes to S406. Meanwhile, when determining that the print data corresponding to the clicked confirmation box 62a is of a color page (S407: Yes), the print preview program 34 goes to S408. In S408, the print preview program 34 causes the display unit 24 to display a warning 64 (see FIG. 6) notifying that it is not possible to select the page corresponding to the clicked confirmation box 62a since the print-requesting user is not permitted to employ the color printing.

(2) Advantageous Effects of Second Embodiment

As described above, according to the print preview program 34 of the second embodiment, a preview image is displayed in a manner to distinguish the preview image showing a printable page permitted to be printed by the printer 3 from the preview image showing an unprintable page not permitted to be printed. Thus, it is possible to display a preview image in view of the print restrictions of the printer 3. Thereby, the user is allowed to easily discriminate printable pages from unprintable pages, in advance of the printing operation.

Further, according to the print preview program 34 of the second embodiment, a preview image of a printable page permitted to be printed is displayed in a state selected as a preview image of a page to be printed. Therefore, it is possible to reduce a burden placed on the user who is about to select, on the print preview screen 62, a preview image of a page to be printed.

Further, according to the print preview program 34 of the second embodiment, a preview image of a white page, even though the page is a printable page permitted to be printed, is displayed in a state not selected as a preview image of a page to be printed. Therefore, it is possible to reduce wasteful printing operations such as printing of a white page.

Further, according to the print preview program 34 of the second embodiment, when clicking a confirmation box 62a of an unprintable page on the print preview screen 62, the user is allowed to realize that the page corresponding to the displayed preview image is not permitted to be printed.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiments will be omitted.

Modifications

In the aforementioned embodiments, as the print restriction information, exemplified are the maximum number of printable sheets and the printing conditions for permitting execution of a printing operation. Nonetheless, the print restriction information may include information indicating a print-permitted remaining amount that is such a remaining amount of a consumable supply for printing as to permit the printer 3 to perform a printing operation. As the consumable supply used for printing, for instance, exemplified are sheets and coloring agent such as toner and ink. In this case, in response to a print request, the printer driver 33 acquires from the printer 3 the remaining amount of the consumable supply. Then, with respect to the print data created for each page in S101, the print preview program 34 estimates an amount of the consumable supply used for other pieces of print data to be printed prior to printing of a target piece of print data. Further, the print preview program 34 determines an amount resulting from subtracting the estimated amount from the acquired amount as a remaining amount of the consumable supply immediately before printing of the target piece of print data. Then, when the determined remaining amount is equal to or more than a previously-set print-permitted remaining amount, the print preview program 34 determines that the target piece of print data is permitted to be printed by the printer 3. Meanwhile, when the determined remaining amount is less than the previously-set print-permitted remaining amount, the print preview program 34 determines that the target piece of print data is not permitted to be printed by the printer 3. The print-permitted remaining amount may be applied in combination with the maximum number of printable sheets. Alternatively, the print-permitted remaining amount may be applied in combination with the printing conditions for permitting execution of a printing operation, or in combination with the maximum number of printable sheets and the printing conditions for permitting execution of a printing operation.

In the aforementioned first embodiment, the gray-out state is exemplified as a display mode for displaying a preview image of an unprintable page not permitted to be printed. However, the display mode for displaying a preview image of an unprintable page not permitted to be printed is not limited to the gray-out state. For instance, a preview image of an unprintable page not permitted to be printed may be displayed with an image indicating a character string "This page is not permitted to be printed" being combined on the preview image.

The aforementioned first and second embodiments may be combined. Specifically, for instance, a preview image of a printable page permitted to be printed may be displayed without being shown in a gray-out state, and the confirmation box 62a of the printable page may be set ON. Additionally, a preview image of an unprintable page not permitted to be printed may be displayed in a gray-out state, and the confirmation box 62a of the unprintable page may be set OFF.

In the aforementioned embodiments, even though a target page is a printable page permitted to be printed, when the target page is a white page, the preview image of the target image is displayed in a gray-out state. However, when a target page is a printable page permitted to be printed, even though the target page is a white page, the preview image of the target image may be displayed without being shown in a gray-out state.

In the aforementioned embodiments, the printer driver 33 is configured to create a preview image of each page. However, the print preview program 34 may be configured to create a preview image of each page.

In the aforementioned embodiments, exemplified is a case where the print preview program 34 is configured to transmit print data to the printer 3. However, the printer driver 33 may be configured to transmit print data to the printer 3.

In the aforementioned embodiments, the printer driver 33 and the print preview program 34 are separate programs. However, the printer driver 33 and the print preview program 34 may be integrated as a single program.

In the aforementioned embodiments, the PC 2 is configured to display a preview of a page to be printed. However, instead of the PC 2, mobile terminal devices such as smartphones and tablet computers may be applied as devices for displaying a preview of a page to be printed. In this case, the application 32, the printer driver 33, and the print preview program 34 may be integrated as a single program.

In the aforementioned embodiments, the color printing is exemplified as a printing condition. Likewise, a determination may be made as to whether a target page is a printable page permitted to be printed, based on a different printing condition. In this case, instead of S206, the print preview program 34 may determine whether the print-requesting user is permitted to employ the different printing condition, based on the print restriction information. Further, instead of S207, the print preview program 34 may determine whether the print data selected in S202 is permitted to be printed, based on the print restriction information. Furthermore, when a plurality of printing conditions are set as the print restriction information, a determination as to whether a target page is a printable page permitted to be printed may be made based on a combination of the plurality of printing conditions.

What is claimed is:

1. A non-transitory computer readable medium storing computer readable instructions for displaying preview images of a plurality of print-requested pages in accordance with an instruction provided by a user, each preview image showing a print result of a corresponding one of the plurality of print-requested pages in advance of generation of a print job of the plurality of print-requested pages, the computer readable instructions being configured to, when executed by a processor coupled to a display device including a display, cause the processor to:
   acquire print restriction information, the print restriction information comprising a remaining number of printable sheets set individually for the user who provides the instruction;
   determine whether the plurality of print-requested pages requested to be printed are permitted to be printed based on the print restriction information, on a page-by-page basis in order from a first page of the plurality of print-requested pages;
   when a number of pages permitted to be printed is equal to the remaining number of printable sheets when the processor determines that a specific page of the plurality of print-requested pages is permitted to be printed, determine that pages subsequent to the specific page are not permitted to be printed;
   control the display to display the preview images for each of the plurality of print-requested pages requested to be printed in a manner to distinguish a preview image for each page determined to be permitted to be printed from a preview image for each page determined not to be permitted to be printed;
   accept an operation of switching a specific page determined not to be permitted to be printed, to a page to be printed;
   in response to accepting the operation, determine whether the specific page is permitted to be printed based on the print restriction information; and
   in response to determining that the specific page is permitted to be printed, control the display to display a preview image of the specific page determined to be permitted to be printed.

2. The non-transitory computer readable medium according to claim 1,
   wherein the print restriction information comprises information indicating a maximum number of printable sheets, the maximum number of printable sheets being set individually for the user who provides the instruction, and
   wherein the computer readable instructions are further configured to, when executed by the processor, cause the processor to:
      acquire an accumulated number of printed sheets indicating a number of sheets which have been printed;

determine that each of the plurality of print-requested pages is permitted to be printed, when an the accumulated number of printed sheets is less than the maximum number of printable sheets; and determine that each of the plurality of print-requested pages is not permitted to be printed, when the accumulated number of printed sheets is equal to or more than the maximum number of printable sheets.

3. The non-transitory computer readable medium according to claim 1, wherein the print restriction information comprises information indicating one or more printing conditions for permitting a printing operation, and wherein the computer readable instructions are further configured to, when executed by the processor, cause the processor to:

determine whether a printing condition set for each of the plurality of print-requested pages is permitted, based on the print restriction information;

determine that each of the plurality of print-requested pages is permitted to be printed, when determining that the printing condition set for the print-requested page is permitted; and determine that each of the plurality of print-requested pages is not permitted to be printed, when determining that the printing condition set for each of the plurality of print-requested pages is not permitted.

4. The non-transitory computer readable medium according to claim 1, wherein the print restriction information comprises information indicating a print-permitted remaining amount that is such a remaining amount of a consumable supply for printing as to permit each of the plurality of print-requested pages to be printed, and wherein the computer readable instructions are further configured to, when executed by the processor, cause the processor to:

determine that each of the plurality of print-requested pages is permitted to be printed, when a remaining amount of the consumable supply is equal to or more than the print-permitted remaining amount; and determine that each of the plurality of print-requested pages is not permitted to be printed, when the remaining amount of the consumable supply is less than the print-permitted remaining amount.

5. The non-transitory computer readable medium according to claim 1, wherein the computer readable instructions are further configured to, when executed by the processor, cause the processor to:

control the display to display the preview image for each page determined to be permitted to be printed in a state selected as a preview image of a page to be printed; and control the display to display the preview image for each page determined not to be permitted to be printed in a state not selected as a preview image of a page to be printed.

6. The non-transitory computer readable medium according to claim 5, wherein the computer readable instructions are further configured to, when executed by the processor, cause the processor to control the display to display a preview image for each page determined to be a white page in the state not selected as a preview image of a page to be printed, regardless of whether the white page is permitted to be printed.

7. The non-transitory computer readable medium according to claim 5, wherein the computer readable instructions are further configured to, when executed by the processor, cause the processor to:

accept a selection of a preview image of an intended page to be printed;

determine, in response to acceptance of the selection, whether the intended page corresponding to the selected preview image is permitted to be printed, based on the print restriction information; and provide information on a result of the determination as to whether the intended page corresponding to the selected preview image is permitted to be printed.

8. The non-transitory computer readable medium according to claim 1, wherein the computer readable instructions are further configured to, when executed by the processor, cause the processor to:

determine whether each of the plurality of print-requested pages is a monochrome page or a color page;

determine that the monochrome page is permitted to be printed; and determine that the color page is not permitted to be printed.

9. The non-transitory computer readable medium according to claim 1, wherein the computer readable instructions are further configured to, when executed by the processor cause the processor to:

acquire user identification information of a particular user, wherein the print restriction information corresponds to the particular user.

10. The non-transitory computer readable medium according to claim 9, wherein the particular user is a user is currently logging-in to the display device.

11. The non-transitory computer readable medium according to claim 1, wherein the operation of switching the specific page comprises:

an operation of cancelling a page determined to be permitted to be printed; and an operation of adding the specific page as a page determined to be permitted to be printed, and wherein the computer readable instructions are further configured to, when executed by the processor cause the processor to:

determine that the specific page is permitted to be printed if a number of pages permitted to be printed among the plurality of print-requested pages is less than the remaining number of printable sheets based on the print restriction information when accepting the operation of adding the specific page.

12. A non-transitory computer readable medium storing computer readable instructions for displaying preview images of a plurality of print-requested pages in accordance with an instruction provided by a user, each preview image showing a print result of a corresponding one of the plurality of print-requested pages in advance of generation of a print job of the plurality of print-requested pages, the computer readable instructions being configured to, when executed by a processor coupled to a display device including a display, cause the processor to:

acquire print restriction information;

determine whether each of the plurality of print-requested pages requested to be printed is permitted to be printed based on the print restriction information;

control the display to display the preview images for each of the plurality of print-requested pages requested to be printed in a manner to distinguish a preview image for each page determined to be permitted to be printed from a preview image for each page determined not to be permitted to be printed;

accept an operation of switching a specific page determined not to be permitted to be printed, to a page to be printed, the operation of switching the specific page comprising:
  an operation of cancelling a page determined to be permitted to be printed; and
  an operation of adding the specific page as a page determined to be permitted to be printed;
in response to accepting the operation, determine whether the specific page is permitted to be printed based on the print restriction information;
in response to determining that the specific page is permitted to be printed, control the display to display a preview image of the specific page determined to be permitted to be printed;
control the display to display, for at least one page determined not to be permitted to be printed, a reason why the at least one page is not permitted to be printed;
determine that the specific page is permitted to be printed if a number of pages permitted to be printed among the plurality of print-requested pages is less than a remaining number of printable sheets based on the print restriction information when accepting the operation of adding the specific page;
determine that the specific page is permitted to be printed if the specific page is a monochrome page and the number of pages permitted to be printed among the plurality of the print-requested pages is less than the remaining number of printable sheets; and
determine that the specific page is not permitted to be printed if at least one of a first requirement and a second requirement is not satisfied, the first requirement being that the specific page is the monochrome page, the second requirement being that the number of pages permitted to be printed among the plurality of the print-requested pages is less than the remaining number of printable sheets.

13. The non-transitory computer readable medium according to claim 12, wherein the computer readable instructions are further configured to, when executed by the processor, cause the processor to:
  in response to determining that the specific page is not permitted to be printed, control the display to display a reason why the specific page is not permitted to be printed.

* * * * *